(12) United States Patent
Kamiya et al.

(10) Patent No.: US 7,644,444 B2
(45) Date of Patent: *Jan. 5, 2010

(54) COMMUNICATION DEVICE, PROGRAM AND RECORDING MEDIA

(75) Inventors: Dai Kamiya, Tokyo (JP); Kazuhiro Yamada, Yokohama (JP); Takashi Kondo, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 676 days.

This patent is subject to a terminal disclaimer.

(21) Appl. No.: 10/684,968

(22) Filed: Oct. 14, 2003

(65) Prior Publication Data

US 2004/0142682 A1    Jul. 22, 2004

(30) Foreign Application Priority Data

Oct. 30, 2002    (JP)    ............... 2002-316635

(51) Int. Cl.
*H04L 9/32* (2006.01)
*G06F 17/30* (2006.01)

(52) U.S. Cl. .................. 726/29; 726/26; 726/27; 726/28; 726/30; 707/103 Y

(58) Field of Classification Search ............ None
See application file for complete search history.

(56) References Cited

U.S. PATENT DOCUMENTS

| | | | |
|---|---|---|---|
| 5,675,782 A | 10/1997 | Montague et al. ........... 395/609 |
| 5,790,423 A | 8/1998 | Lau et al. ................. 364/514 R |
| 5,848,232 A * | 12/1998 | Lermuzeaux et al. ......... 726/21 |
| 6,088,708 A | 7/2000 | Burch et al. ................. 707/509 |
| 6,173,404 B1 * | 1/2001 | Colburn et al. ................ 726/17 |
| 6,199,046 B1 * | 3/2001 | Heinzle et al. ................ 705/1 |
| 6,219,787 B1 * | 4/2001 | Brewer ...................... 713/167 |
| 6,704,873 B1 * | 3/2004 | Underwood ................. 726/12 |
| 6,871,277 B1 * | 3/2005 | Keronen ..................... 713/167 |
| 7,093,298 B2 * | 8/2006 | Rodriquez et al. ............ 726/28 |
| 2001/0029581 A1 | 10/2001 | Knauft ........................ 713/193 |
| 2002/0103942 A1 | 8/2002 | Comeau .................... 709/321 |
| 2002/0120859 A1 * | 8/2002 | Lipkin et al. ................ 713/200 |

(Continued)

FOREIGN PATENT DOCUMENTS

CN    1292897 A    4/2001

(Continued)

OTHER PUBLICATIONS

"Introduction to CORBA", HTTP://java.sun.com/developer/onlineTraining/corba.html, Dec. 3, 1999, pp. 1-24.*

(Continued)

*Primary Examiner*—Jung Kim
(74) *Attorney, Agent, or Firm*—Brinks Hofer Gilson & Lione

(57) ABSTRACT

A mobile phone receives a program and identification information of a trusted application for the program, specifies data to be used in executing the program, generates a type of object by selecting either an imperfect encapsulated object or a perfect encapsulated object to be generated on the basis of the identification information of a trusted application, and uses the data by using only the generated object when the program is executed.

16 Claims, 12 Drawing Sheets

U.S. PATENT DOCUMENTS

| | | | |
|---|---|---|---|
| 2005/0235291 A1 | 10/2005 | Kamiya et al. | |
| 2009/0193515 A1 | 7/2009 | Kamiya | 726/17 |

FOREIGN PATENT DOCUMENTS

| | | |
|---|---|---|
| EP | 1 061 440 A2 | 12/2000 |
| JP | 11272616 A | 10/1999 |
| JP | 2001-43176 A | 2/2001 |
| JP | 2001-350664 A | 12/2001 |
| WO | WO 00/28398 A1 | 5/2000 |

OTHER PUBLICATIONS

Anonymous: "The Common Object Request Broker: Architecture and Specification" *Internet Article "Online!"* <URL: http://www.omg.org/docs/formal/97-02-25.pdf>, XP002286451, Feb. 25, 1997, 28 Pages.

Magelang Institute: "Introduction to CORBA", *Internet Article "Online!"* <URL: http://java.sun.com/developer/onlineTraining/Downloads/CORBA-JDC.ZIP>, XP002286452, Dec. 3, 1999, 24 Pages.

Oaks, S. "Java Security", *O'Reilly & Associates, Inc.,* USA XP002286453, May 2001, 4 Pages.

Kaku, T. et al, "Hajimete no i-mode Java programming (introduction to Java Programming in i-mode)", Nikkei Business Publications, Inc. Mar. 26, 2001, pp. 30-41 (with concise explanation).

Oaks, S. "Java Security, $2^{nd}$ Edition", O'Reilly Media, Inc., May 2001, Chapter 2 and 4.

"i-appli Content Developer's Guide for Doja-3.0 Shosai-Hen (i-appli Content Developer's Guide for Doja-3.0 Functional Descriptions)", NTT Docomo, Inc., Apr. 17, 2003 (with English version on Dec. 18, 2003).

Yamato, T., "Keitai Yogo no Kiso Chisiki Dai 132 Kai": i-Appli DX towa? (Basic Terminology in Mobile Phone Technology, Series 132: What is i-Appli DX?), Impress Corp., May 13, 2003 (with partial translation).

International Search Report issued Sep. 2, 2003 in International application No. PCT/JP03/06099.

Office Action issued May 12, 2006 in Chinese patent application No. 03809706.0 (with translation).

Supplementary European Search Report issued Nov. 5, 2007 in European patent application No. 03723394.7.

IBM Cryptolope Live!, "The Cryptolope Live! Product", XP002908144, General Information Guide, Version 1 Release 1, 1997, pp. 1-36.

Gong, "Java Security Architecture (JDK1.2).", Version 1.0, XP-002171445, pp. 1-62, Dec. 6, 1998.

Kaplan, "IBM Cryptolopes, SuperDistribution and Digital Rights Management", XP-002132994, Dec. 30, 1996.

Office Action dated Nov. 17, 2008, issued in U.S. Appl. No. 10/514,685, Publication No. 2005-0235291 A1.

Office Action dated Jun. 4, 2009, issued in U.S. Appl. No. 10/514,685, Publication No. 2005-0235291 A1.

Examiner Interview Summary dated Jun. 29, 2009, issued in U.S. Appl. No. 10/514,685, Publication No. 2005-0235291 A1.

Office Action dated Oct. 20, 2009, issued in U.S. Appl. No. 10/514,685.

Deitel et al., "Java —How to Program," 1999, Prentice Hall, Third Edition, pp. 366-371 and 774-816.

* cited by examiner

| APPNAME | PACKAGE URL | APPSIZE | .... | LAST MODIFIED | TRUSTED APPLICATION IDENTIFIER |

FIG. 12

| | | TRUSTED APPLICATION IDENTIFIER | | |
|---|---|---|---|---|
| | | LEVEL OF TRUST LOW | LEVEL OF TRUST MIDDLE | LEVEL OF TRUST HIGH |
| DATA | LEVEL OF IMPORTANCE HIGH | PERFECT ENCAPSULATED OBJECT | PERFECT ENCAPSULATED OBJECT | IMPERFECT ENCAPSULATED OBJECT |
| | LEVEL OF IMPORTANCE MIDDLE | PERFECT ENCAPSULATED OBJECT | IMPERFECT ENCAPSULATED OBJECT | IMPERFECT ENCAPSULATED OBJECT |
| | LEVEL OF IMPORTANCE LOW | IMPERFECT ENCAPSULATED OBJECT | IMPERFECT ENCAPSULATED OBJECT | IMPERFECT ENCAPSULATED OBJECT |
| AVAILABLE OBJECT | | PERFECT ENCAPSULATED OBJECT, IMPERFECT ENCAPSULATED OBJECT | PERFECT ENCAPSULATED OBJECT, IMPERFECT ENCAPSULATED OBJECT | PERFECT ENCAPSULATED OBJECT, IMPERFECT ENCAPSULATED OBJECT |

| | | TRUSTED APPLICATION IDENTIFIER | | |
|---|---|---|---|---|
| | | LEVEL OF TRUST LOW | LEVEL OF TRUST MIDDLE | LEVEL OF TRUST HIGH |
| DATA | LEVEL OF IMPORTANCE HIGH | PERFECT ENCAPSULATED OBJECT | PERFECT ENCAPSULATED OBJECT | PERFECT ENCAPSULATED OBJECT |
| | LEVEL OF IMPORTANCE MIDDLE | IMPERFECT ENCAPSULATED OBJECT | IMPERFECT ENCAPSULATED OBJECT | IMPERFECT ENCAPSULATED OBJECT |
| | LEVEL OF IMPORTANCE LOW | IMPERFECT ENCAPSULATED OBJECT | IMPERFECT ENCAPSULATED OBJECT | IMPERFECT ENCAPSULATED OBJECT |
| AVAILABLE OBJECT | | NONE | PERFECT ENCAPSULATED OBJECT | PERFECT ENCAPSULATED OBJECT, IMPERFECT ENCAPSULATED OBJECT |

COMMUNICATION DEVICE, PROGRAM AND RECORDING MEDIA

TECHNICAL FIELD

The present invention relates to technology for ensuring data security in a communication device.

BACKGROUND ART

It has become common practice to download programs from a server connected to the Internet, using a mobile phone having a packet communication function.

While the Internet enables people worldwide to exchange programs freely, it also has inherent risks, including for example, data theft from a communication device. Also, a program which causes a malfunction in a communication device may be provided without malicious intent. In view of these risks, user privacy is a major concern.

It is possible to restrict the functions of programs provided to mobile phones. For example, a mobile phone which is able to execute programs written in Java® imposes restrictions on such programs. Specifically, programs are only authorized to access the following resources, 1) a server that downloads a program(s), and 2) a storing area assigned to a program(s), and programs are not authorized to access resources such as a user's telephone number, e-mail address or telephone book data. Further, a mobile phone is able to ensure security for personal information stored in a communication device by processing such personal information using only native programs. An example of such technology is described in the following reference:

i Apuricontentsukaihatsuguide for 504i Syousaihen Internet<URL http://www.nttdocomo.co.jp/p_s/imode/java/>

Here, a native program means a program to be written in a memory of a mobile phone which is not yet publicly available.

The mechanism of limiting access to resources, as described above, provides some security for users of mobile phones, However, it causes various limitations in the operation of downloaded programs. That is to say, it restricts program diversification. The present invention has been made with a view to overcoming the above-mentioned problems, and has as its object the provision of technology for providing a diversity of programs while ensuring the security of the data stored in a communication device such as a mobile phone.

DISCLOSURE OF INVENTION

To solve the above problems, the present invention provides a communication device comprising a storing means for storing data, an obtaining means for obtaining a program using a method for accessing data, an executing means for executing the program and, in accordance with the program, using data which the program is permitted to use, a specifying means for specifying, from among data stored in the storing means, data which is required to be used by the program, a selecting means for selecting from either an imperfect encapsulated object or a perfect encapsulated object for the program, the imperfect encapsulated object being an object which utilizes a method to provide data included in the object to a program which accesses the object, and the perfect encapsulated object being an object which does not utilize such a method, an object generating means for generating, in accordance with the selection made by the selecting means, either an imperfect encapsulated object or a perfect encapsulated object for the program, the generated object including data specified by the specifying means, and an access control means for controlling access to the data specified by the specifying means, and for permitting the executing means to access the data only via the object generated for the program by the object generating means.

According to the invention, a communication device receives a program and identification information for the program, specifies, from among stored data, data to be used in the case of executing the program, selects either one of an imperfect encapsulated object or a perfect encapsulated object for the program, generates a type of object selected, the generated object including the specified data, and uses the data only via the generated object when the program is executed.

BRIEF DESCRIPTION OF THE DRAWINGS

FIG. 12 is a diagram showing the data configuration of an application data table stored into nonvolatile memory in a mobile phone according to the second embodiment.

FIG. 14 is diagram showing the data configuration of the application data table stored into nonvolatile memory in a mobile phone according to the modifications of the present invention.

EMBODIMENTS OF THE INVENTION

1. First Embodiment

The first embodiment of the present invention will be described with reference to the diagrams. Like numerals denote like elements in the figures.

Figure 1:
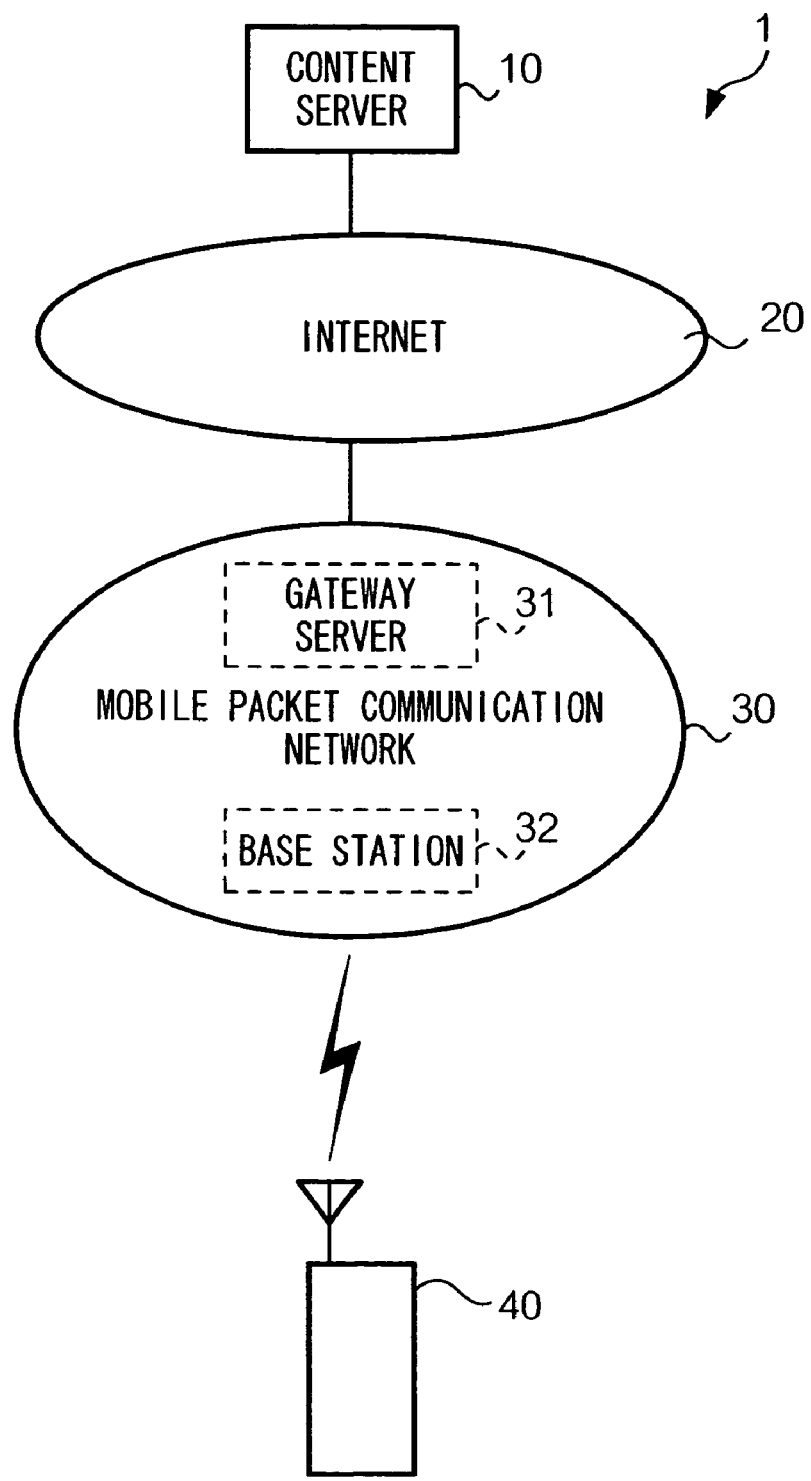
FIG. 1 is a block diagram showing the configuration of a communication system according to the first embodiment of the present invention.

1-1. Configuration of the Embodiment 1-1-1. Configuration of a Communication System FIG. 1 is a block diagram showing the configuration of a communication system 1 according to the first embodiment of the present invention. As shown in this figure, communication system 1 is comprised of a content server 10, the Internet 20, a mobile packet communication network 30, and a mobile phone 40. In general, in this communication system 1, a plurality of mobile phones 40 is located. However, for the sake of simplicity, only one mobile phone 40 is shown in FIG. 1. For the same reason, only one content server 10, one content server 31, and one base station 32 are shown in FIG. 1.

Content server 10 has a function of executing a packet communication with mobile phone 40 via the Internet 20 and mobile packet communication network 30. Various contents such as a program to be provided to mobile phone 40, or image data and music data are stored in content server 10. One of the contents is a Java application program (Hereafter, referred to as "Java AP") which can be executed in mobile phone 40.

Mobile packet communication network 30 is a communication network for providing a packet communication service with mobile phone 40. Gateway server 31 relays the transmission and reception of data between mobile packet communication network 30 and the Internet 20. Further, a plurality of base stations 32 are located in a communication service area of mobile packet communication network 30, and base station 32 executes radio communication with mobile phone 40.

Mobile phone 40 executes radio communication with base station 32. Further, mobile phone 40 has a function of executing a packet communication with content server 10 through mobile packet communication network 30 and the Internet 20, and is able to download contents from content server 10.

1-1-2. Configuration of a Mobile Phone

Figure 2:
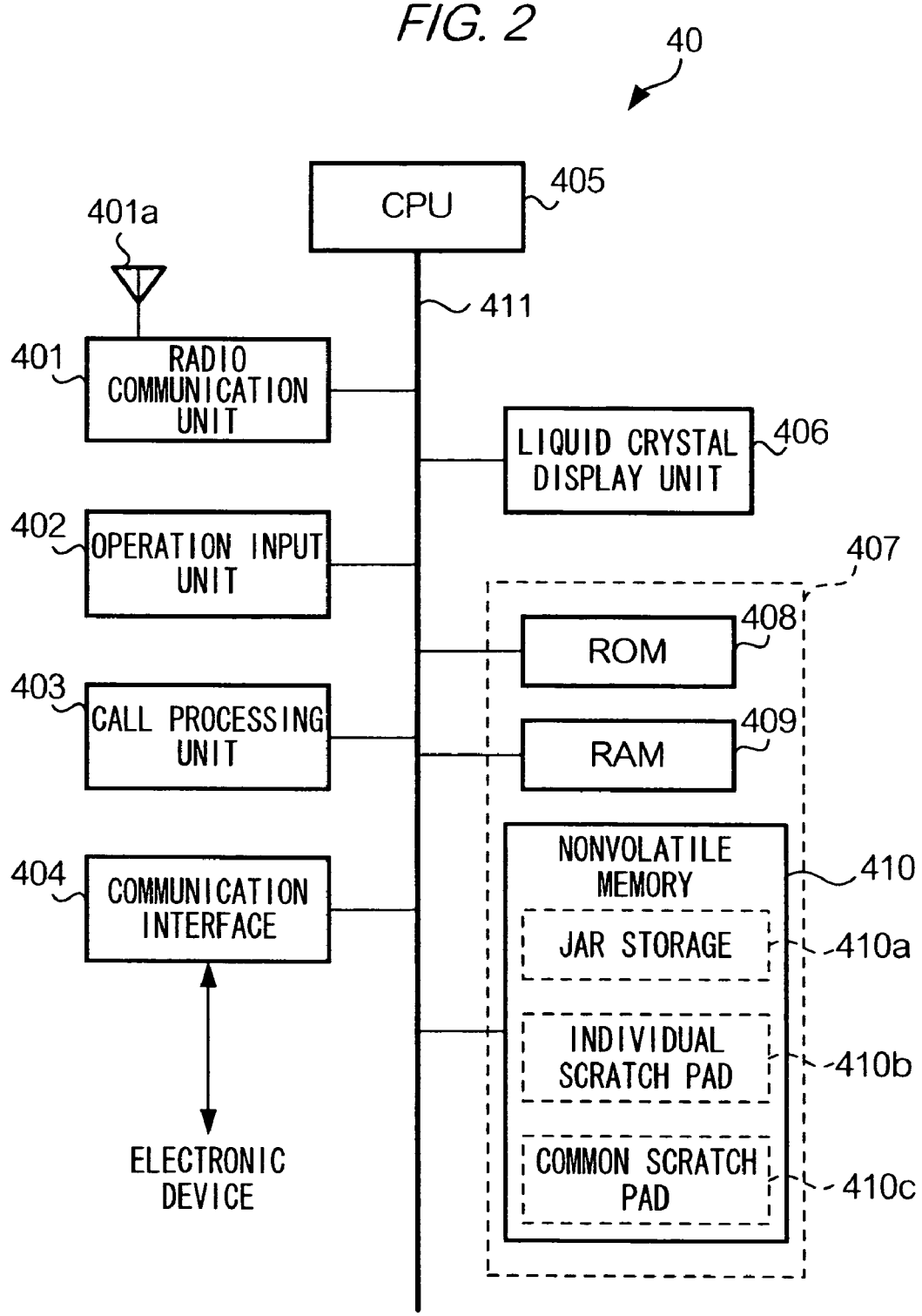
FIG. 2 is a block diagram showing the hardware configuration of a mobile phone according to the first embodiment.

FIG. 2 is a block diagram showing the hardware configuration of mobile phone 40. As shown in this figure, mobile phone 40 is comprised of a radio communication unit 401, an operation input unit 402, a call processing unit 403, a communication interface 404, and CPU 405, a liquid crystal display unit 406, and memory unit 407, which are connected to each other by bus 411.

Radio communication unit 401 has an antenna 401a, and controls radio communication with base station 32. Radio communication unit 401 generates a transmission signal by superimposing voice data or packet communication data on a carrier wave under the control of CPU 405, and transmits this signal to base station 32. Further, radio communication unit 401 receives a radio signal transmitted from base station 32 through antenna 401a, and obtains voice data for mobile phone 40 and packet communication data by demodulating this signal.

Operation input unit 402 has a plurality of keys for inputting numbers, characters, instructions for operation and the like, and outputting operation signals corresponding to key operations, to CPU 405. Further, processing unit 403 has, for example, a microphone, a speaker, a voice processing unit and the like, and executes a call process including a call connection/disconnection under the control of CPU 405.

Communication interface 404 controls a wired communication with electronic devices connected through a communication cable. Further, CPU 405 controls each control unit connected via bus 411 by executing various programs stored in memory unit 407. Further, liquid crystal display unit 406 is comprised of a liquid crystal display panel and a drive circuit for executing a display control of the liquid crystal display panel.

Memory unit 407 is comprised of ROM 408, RAM 409, a nonvolatile memory 410 such as SRAM (Static RAM) and EEPROM (Electrically Erasable Programmable-ROM). Software such as an operating system (Hereafter, referred to as "OS") for mobile phone 40 and Web (World Web Wide) browser, or software for constructing Java execution environment are stored in ROM 408. Further, RAM 409 is used as a work area for CPU 405, and various programs and data executed by CPU 405 are stored in RAM 409 temporarily.

Programs designed for mobile phone 40 are stored in nonvolatile memory 410 from the time of shipping mobile phone 40. Contents such as Java AP downloaded from content server 10 are stored in nonvolatile memory 410. Additionally, various data is stored in nonvolatile memory 410, such as address book data which includes data for showing a telephone number or an e-mail address, received or transmitted e-mail data, history data on incoming and outgoing calls, data for showing a user's bank account number to enable electronic payment, and data for showing a credit card number.

Hereafter, a program, stored in ROM 408 and nonvolatile memory 410, at the time of shipping mobile phone 40 is referred to as a "Native Program" to distinguish downloaded Java AP. Identification information is given to a native program, showing the program is a native program.

Further, nonvolatile memory 410 is comprised of a JAR (Java Archiver) storage 410a, an individual scratch pad 410b, and a common scratch pad 410c.

Here, Java AP to be downloaded into mobile phone 40 will be described before individual scratch pad 410b and common scratch pad 410c. Java AP is comprised of a JAR file which is a main program for Java AP, and an image file and a sound file to be used together in the execution of the main program for Java AP, along with an ADF (Application Describer File) in which various control information is written, for installing and activating JAR file and controlling the network access. Downloaded JAR file and ADF file are stored in nonvolatile memory 410.

Figures 3, 5:
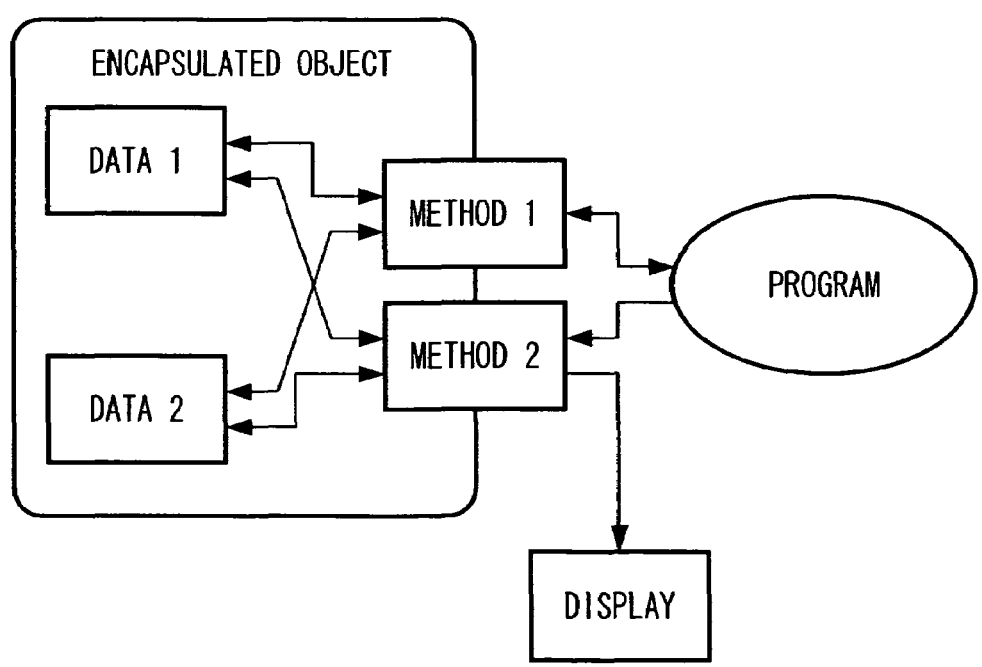
FIG. 3 is a diagram showing the data configuration of ADF stored in nonvolatile memory in a mobile phone according to the first embodiment.
FIG. 5 is a view explaining an encapsulated object in a mobile phone according to the first embodiment.

In this embodiment, as shown in FIG. 3, "A Trusted Application Identifier" is included in ADF in addition to known data, in the prior art, such as "AppName" showing Java AP, "PackageURL" showing URL of JAR file, "Appsize" showing the size of JAR file, "Lastmodified" showing the date of the last update. A trusted application identifier is data for identifying Java AP and programs other than Java AP, and for identifying Java AP whose content is reviewed by a third party such as a telecommunication carrier which manages mobile packet communication network 30 and CA(Certificate Authority), and which is certified as meeting specified standards. Some examples of standards are; a program is able to manage data stored in mobile phone 40 without leaking data, and a program is operated in mobile phone 40 in a conventional manner. Since the above third party is trusted by all who have joined a communication service offered the program certified by the third party can be trusted. Consequently, such a program is called a "Trusted Application", and other programs are called "Non-Trusted Applications". A trusted application identifier shows that Java AP corresponding to an ADF file is a non trusted-application if the value of the trusted application identifier is zero, and Java AP corresponding to an ADF file is a trusted-application if the value of the trusted application identifier is 1.

Storage area for Java AP is installed into JAR storage 410*a* and individual scratch pad 410*b* per downloaded Java AP. JAR file for Java AP is stored in each storage area of JAR storage 410*a*. Further, for example, generated data for Java AP in accordance with the usage of Java AP, such as past score data or save data, is stored into each storage area of individual scratch pad 410*b* if Java AP is a game program. Further, data which a plurality of Java Application programs commonly uses is stored in common scratch pad 410*c*.

Further, when Java AP is executed in mobile phone 40 after a download, resources which mobile phone 40 is able to access are limited to a content server 10 from which programs are downloaded, a storage area assigned to Java AP, JAR storage 410*a* and individual scratch pad 410*b*, and common scratch pad 410*c*. Mobile phone 40 is not authorized to access other resources.

1-1-3. Java Execution Environment

Figure 4:
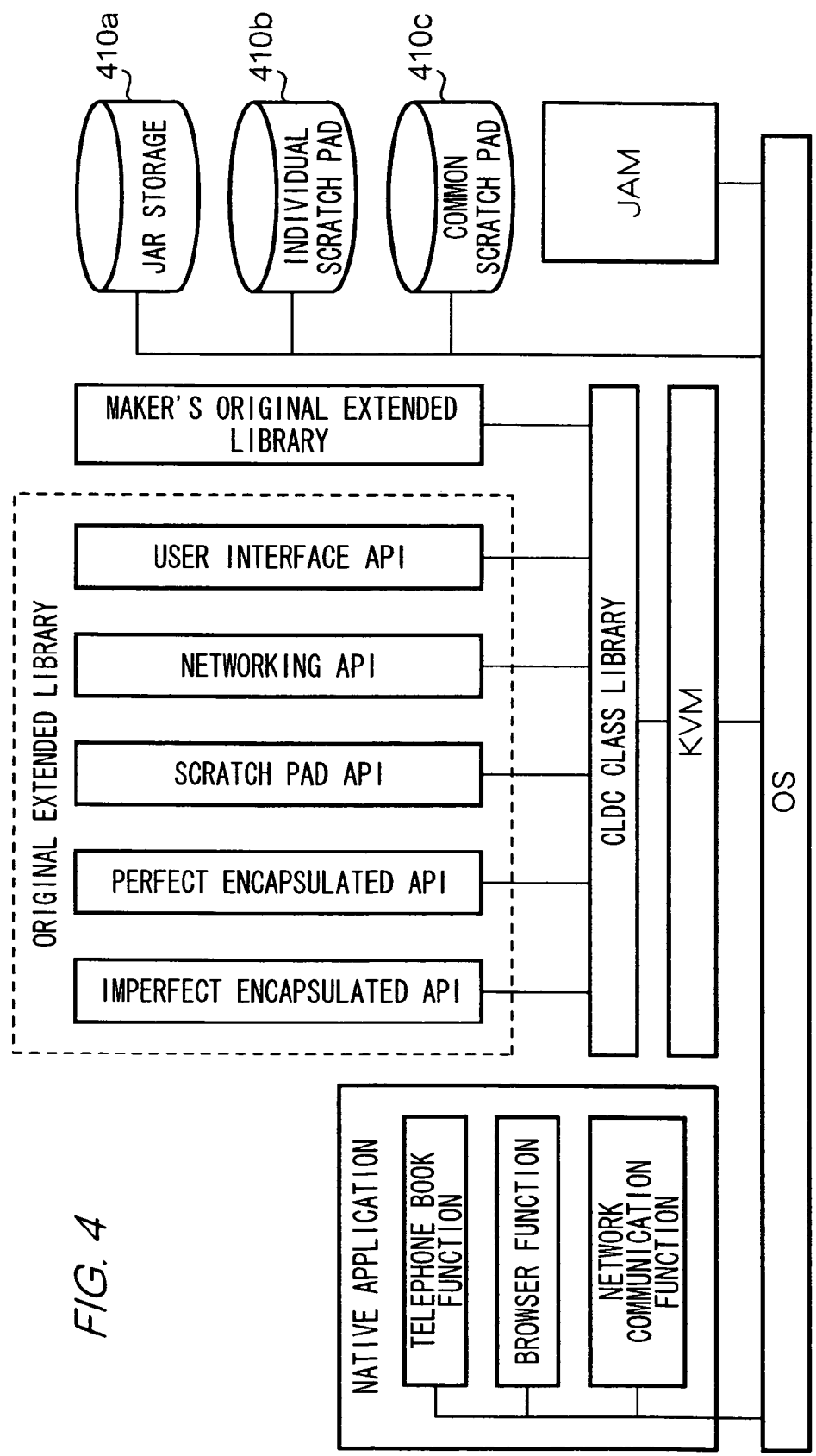
FIG. 4 is a diagram explaining execution environment of Java AP in a mobile phone according to the first embodiment.

FIG. 4 is a diagram explaining execution environment of Java AP in mobile phone 40. In this figure, software for constructing the execution environment of Java AP (KVM (K Virtual Machine)), a configuration (CLDC(Connected Limited Device Configuration)), and a profile (an original extended library originally developed by a telecommunication carrier) are stored in mobile phone 40.

KVM is a JVM(Java Virtual Machine) redesigned for a small electronic device, and translates into an instruction code which CPU 405 is able to interpret/execute through OS, a byte code which is execution file format of Java AP. Further, CLDC class library is a class library for CLDC.

The original extended library is a class library for providing functions specified for a mobile phone on the basis of CLDC. For example, user interface API(Application Program Interface), Networking API, Scratch Pad API, Perfect Encapsulated API, Imperfect Encapsulated API, and the like are included in the original extended library.

Here, user interface API is API for supporting user interface functions of mobile phone 40, and network API is API for supporting access to network resources designated by URL (Uniform Resource Locator). Further, scratch pad API is API for supporting writing in or reading out data for individual scratch pad 410*b* and common scratch pad 410*c*. Further, perfect encapsulated API is API for generating a perfect encapsulated object, and an imperfect encapsulated API is API for generating an imperfect encapsulated object.

Further, mobile phone 40 has a maker's original extended library in addition to CLDC class library and original extended library. The maker's original extended library is a class library via which each maker of mobile phone 40 provides original functions.

Next, JAM (Java Application Manager) has functions to manage Java AP downloaded into mobile phone 40, a perfect encapsulated object, an imperfect encapsulated object and the like under the control of OS. For example, Java has functions to update and to delete the installation of Java AP, to display a list of Java AP stored into nonvolatile memory 410, to perform execution/management (e.g. activation and forced termination) of Java AP, to limit the access by mobile phone 40 in the execution of Java AP, and to generate, to update and to delete a perfect encapsulated object and an imperfect encapsulated object.

Further, as shown in this figure, a native program which offers a telephone book function, a browser function, and the like is directly executed under the control of an OS.

1-1-4. Configuration of an Object

Next, an object will be described. The object is a set of data ("Field" in Java programming language) and operation ("Method" in Java programming language). In Java programming language, an access indicator "private" declaring that each field in the object is a private field, is used for encapsulation of data stored in the private field. An encapsulated object is made via the encapsulation.

FIG. 5 is a view explaining an encapsulated object. As shown in this figure, the encapsulated object is comprised of more than one item of encapsulated data, and more than one method for making possible operation of each item of encapsulated data from the outside object.

As shown in this figure, an encapsulated object having two items of data, data 1 and data 2, and two methods, method 1 and method 2 is shown. Since data 1 and data 2 are encapsulated in the encapsulated object, data 1 and data 2 are not directly read out or written in from the outside of the object. Consequently, when the downloaded program accesses data 1 and data 2 in the encapsulated object, the program (=the program which performs the instruction) has to instruct the encapsulated object to operate for objective data 1 and data 2 by using method 1 and method 2.

In this figure, when method 1 is, for example, a method for providing designated data to the program which performs the instruction, the program which performs the instruction is able to obtain optional data 1 and data 2 in the encapsulated object by using method 1. Further, when method 2 in this figure is, for example, a method for displaying the designated data on a liquid crystal display, the program which performs the instruction is able to display optional data 1 and data 0.2 in the encapsulated object by using method 2. The important point is that the program, which has displayed optional data 1 and data 2 of the encapsulated object on the display by using method 2, instructs the encapsulated object to display optional data 1 and data 2 by using method 2, even though the program itself does not obtain the data to be displayed.

More specifically, in the case of an encapsulated object (perfect encapsulated object) which does not have any methods for providing data to the program which performs the instruction, the program which performs the instruction is not able to obtain data stored in the encapsulated object, but is able to control data stored in the encapsulated object by using the methods belonging to the encapsulated object.

Accordingly, in the case that the program which performs the instruction is a non-trusted application, when data accessed by the program is managed as a perfect encapsulated object, the data stored in mobile phone 40 is secure because the data is not given to the program. Further, even though the program which performs the instruction is a non-trusted application, the program is able to access the data by using methods belonging to the encapsulated object, such as address book data and electronic mail data which are not generally accessible for security reasons.

Figure 6:
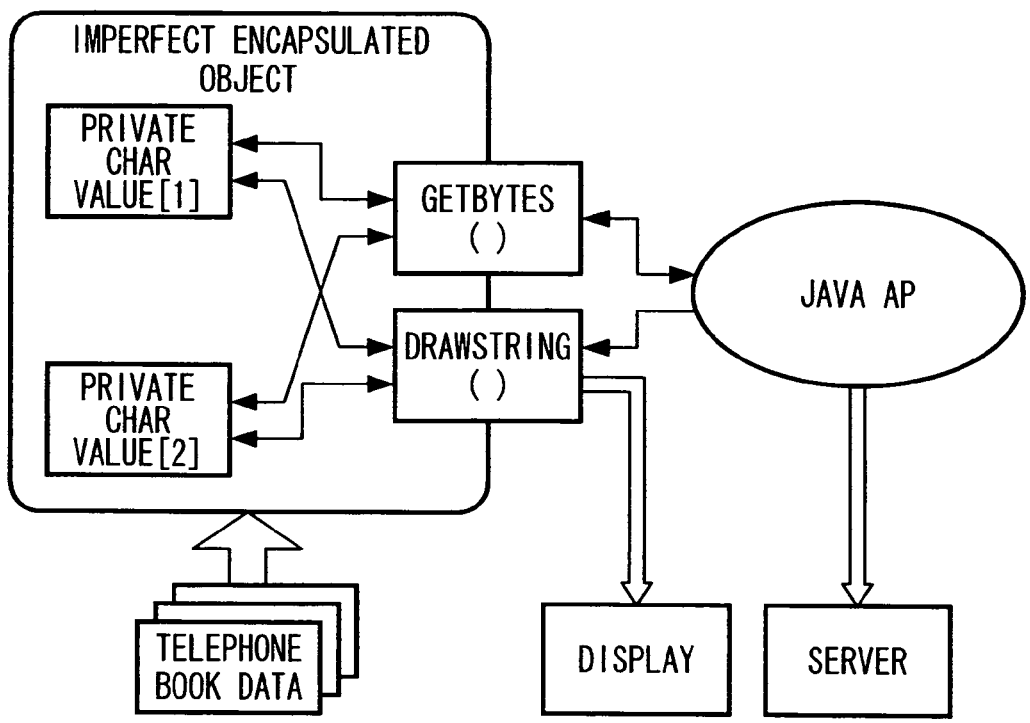
FIG. 6 is a view exemplifying an imperfect encapsulated object in a mobile phone according to the first embodiment.

FIG. 6 is a view exemplifying an imperfect encapsulated object with regard to telephone book data. As described above, In Java programming language, encapsulation of data to be stored in a private field is executed by declaring each field in the object to be a private field via an access qualifier known as "private". In other words, every field in the object is a private field, data stored in a private field cannot be read out from the outside of an object. In such a case, to enable the program which performs the instruction to access data from the outside object, the program which performs the instruction needs to instruct the object to control (access) data stored in each private field by using the methods belonging to the object.

Two private fields are installed into an imperfect encapsulated object in this figure, and character string data of a telephone book, "private char value[1]" and "private char value[2]" are stored in an imperfect encapsulated object. Further, an imperfect encapsulated object has two methods known as "getBytes( )" and "drawString( )". getBytes( ) is a method for providing data stored in an object in a byte array form to the program which performs the instruction. Consequently, downloaded Java AP is able to obtain a character string data of a telephone book, "private char value[1]" and "private char value[2]" stored in an imperfect encapsulated object by using the method, "getBytes( )". Additionally, Java AP is able to transmit the obtained character string data of a telephone book stored in an imperfect encapsulated object to content server 10(A server which performs downloading Java AP).

Further, drawstring( ) is a method for displaying data stored in an object on a liquid crystal display of mobile phone 40. Java AP is able to display character string data of a telephone book ("private char value[1]" and "private char value[2]") stored in an imperfect encapsulated object on a liquid crystal display of mobile phone 40.

Figure 7:
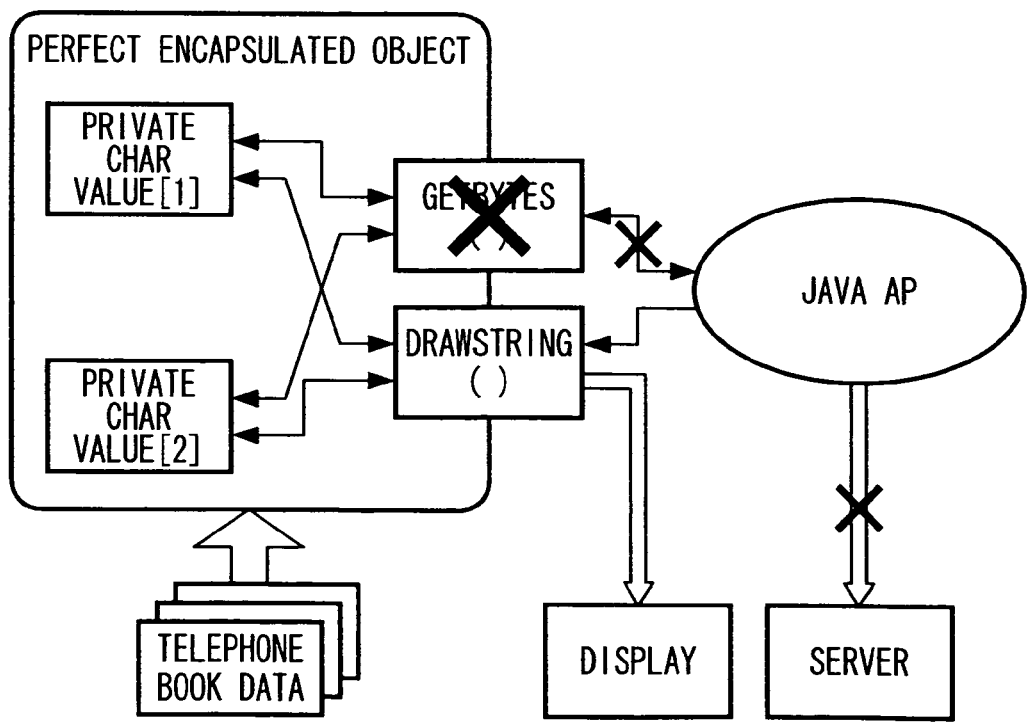
FIG. 7 is a view exemplifying a perfect encapsulated object in a mobile phone according to the first embodiment.

FIG. 7 is a view exemplifying a perfect encapsulated object with regard to telephone book data. The difference between a perfect encapsulated object in FIG. 7 and an imperfect encapsulated object in FIG. 6 is that a perfect encapsulated object does not have a method for providing data stored in an object to the program which performs the instruction.

More specifically, because an object is "perfectly" encapsulated, it does not have a method for providing the data stored in the object to the program which performs the instruction. Accordingly, the downloaded Java AP is able to display character string data of a telephone book ("private char value[1]" and "private char value[2]") stored in an imperfect encapsulated object on a liquid crystal display of mobile phone 40 by using the method known as "drawstring( )", but is unable to obtain character string data of a telephone book. For the above-described reason, even though a non-trusted application is downloaded into mobile phone 40, the telephone book data is not provided to the non-trusted application, and therefore, the telephone book data cannot be transmitted to the outside of mobile phone 40(e.g. to a Server).

The character string data of a telephone book stored in the object is displayed by using the method, "drawstring( )", a perfect encapsulated object and an imperfect encapsulated object display the character string data of a telephone book on a liquid crystal display by using a display control program stored in ROM 408 or nonvolatile memory 410 as a native program. If Java AP were able to obtain the displayed data by using the display control program, there would be no advantage to using a perfect encapsulated object and an imperfect encapsulated object.

However, when the downloaded Java AP is executed, mobile phone 40 is limited to accessing resources in the execution of Java AP by an access limitation function of JAM described above. Since, in executing Java AP, the display control program is not included in the resources which mobile phone 40 is authorized to access, it is impossible for Java AP to obtain the displayed data from the display control program.

Further, it is plausible that an object may be encapsulated at the level of programming language, or encapsulated at the level of an executable code (machine language or byte code). If it is encapsulated in a perfect manner at the level of programming language, however, it can not also be encapsulated in a perfect manner at the level of an executable code, and therefore data is not encapsulated in a perfect manner. As an example, a program using $C^{++}$ (programming language) is able to generate an encapsulated object having private fields, but the program using $C^{++}$ is able to achieve perfect encapsulation only at the level of programming language.

More specifically, when the program using $C^{++}$ declares every field stored in the object as a private field, and generates an encapsulated object, if the program compiles a source code for reading and writing data directly stored in a private field, an execution code is not generated for a compile error.

It should be noted that an execution code is determined only by a compiler. For example, a third person having malicious intent is able to generate an executable code for reading and writing data directly stored in a private field of an object by modifying a compiler. Further, such a person is able to create a program for generating an executable code which reads out data stored in an object by a method of user-input and the like. Moreover, it is possible to obtain data stored in an object only if a person gets direct access to a memory by suing a pointer.

On the other hand, with regard to Java, a field declared as a private field is compiled using a Java byte code showing the field has a private attribute. When KVM expands a class file to RAM 409, the filed keeps its private attribute. Accordingly, if a third person generates a byte code for reading out data stored in a private field of an object by modifying a compiler, KVM or JAM detects the code generation and therefore, the third person cannot obtain the data stored in the object. Further, Java does not support a pointer, and therefore, a malicious third person cannot obtain data stored in an object by gaining direct access to a memory with a pointer.

For the above reasons, in Java, an object is encapsulated in a perfect manner at the level of a byte code as well as at the level of programming language.

1-2. Operation of the Embodiments

Next, the operation of the embodiments

It is assumed that mobile phone 40 performs a packet communication with content server 10 through mobile packet communication network 30 and the Internet 20, and downloads Java AP from content server 10, and stores it in non-volatile memory 410. Further, address book data, electronic mail data and user data are stored in nonvolatile memory 410 in addition to the downloaded Java AP(JAR file and ADF file).

1-2-1. Object Generation Process

The object generation process executed by CPU 405 in mobile phone 40 will be described with reference to FIG. 8. The object generation process is executed by CPU 405 as a JAM a function, and, for example, it is executed when a program to be executed is designated from a program list displayed on a display by an operation input. The embodiment for instructing to execute a program is not limited to an operation input, for example, when executing a program is instructed at a predetermined time, when executing a program is instructed by other programs which have already been executed, or when executing a program is instructed via e-mail and the like from outside mobile phone 40.

As shown in this figure, CPU 405 in mobile phone 40 specifies a designated program as an executed program via an input operation (Step S101). Next, CPU 405 determines whether the specified program is the downloaded Java AP, or a native program (Step S102). As described above, identification information, for showing that the program is a native program, is provided to the native program. Consequently, CPU 405 determines whether the program is the downloaded Java AP or a native program, by determining whether the above identification information is provided to the program.

As a result, if CPU 405 determines that the program is a native program (Step S102:No), CPU 405 terminates an object generation process, and activates execution of the designated native program as a program to be executed. Then, CPU 405 performs processing on the basis of the executed native program. In this case, when the program to be executed is a native program, it is not necessary to use a perfect encapsulated object or imperfect encapsulated object, or to operate an access limitation function of JAM in the execution of a native program. Consequently, when a native program is executed, an access limitation by JAM is not executed. Therefore, a native program is able to access optional resources stored in mobile phone 40, or optional resources on the network.

On the other hand, if CPU 405 determines that the program is the downloaded Java AP(Step S102:Yes), CPU 405 specifies the data to be used in the execution of Java AP from various data stored in nonvolatile memory 410 by, for example, analyzing program contents for Java AP(Step S103). When Java AP specifies the data to be used, the data stored in a JAR file of Java AP is excluded as data not specified since the data stored in a JAR file is data prepared by a content provider for providing Java AP as data necessary for executing Java AP.

Next, CPU 405 determines whether the object type for managing the specified data is "a perfect encapsulated object" or "an imperfect encapsulated object" by referring to a trusted application identifier included in an ADF file (Step S104). For example, when a trusted application identifier is "1", Java AP corresponding to the ADF file is a trusted application, and therefore CPU 405 determines the object type for managing the specified data as "a perfect encapsulated object".

CPU 405 generates a perfect encapsulated object or an imperfect encapsulated object on the basis of the specified data at Step S103 and the determined object type at Step S104(Step 105). For example, if CPU 405 determines the object type for managing data as "a perfect encapsulated object" at Step 104, CPU 405 activates a perfect encapsulated API into an original extended library and generates perfect encapsulated objects for every item of specified data. Further, the object type for managing data is determined as "an imperfect encapsulated object" at Step S104, CPU 405 activates an imperfect encapsulated API in an original extended library and generates imperfect encapsulated objects for every item of specified data.

Next, CPU 405 stores an object in individual scratch pad 410*b*, the generated perfect encapsulated object or the generated imperfect encapsulated object (Step S106), and terminates the object generating process. The generated perfect encapsulated object or imperfect encapsulated object at Step S105 may be stored in common scratch pad 410*c*.

1-2-2. Access Management Process

Figure 9:
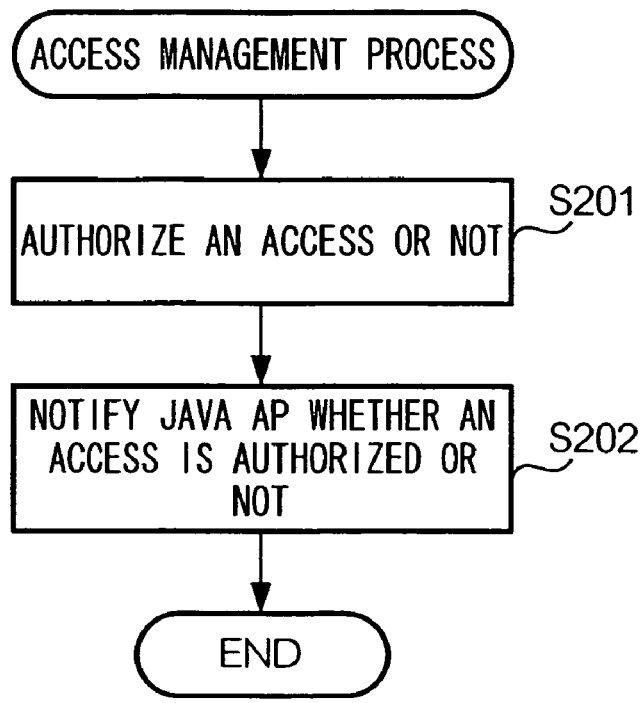
FIG. 9 is a flowchart explaining the access management process executed by CPU in a mobile phone according to the first embodiment.

Next, the access management process executed by CPU in mobile phone 40 will be described with reference to FIG. 9. The access management process is executed by CPU 405 as a JAM function, and is executed as an interruption process when an access request is generated in the execution process of the downloaded Java AP.

As shown in the figure, CPU 405 in mobile phone 40 distinguishes whether a requested access point is within the range of the pre-authorized resources, and determines whether the access (to the resources) is authorized (Step S201). To determine authorization of access, when the downloaded Java AP is executed, CPU 405 limits the resources in the execution of Java AP to the following: content server 10 which downloads Java AP designated by a URL written into ADF of Java AP, JAR storage 410*a* assigned to Java AP, storage area into individual scratch pad 410*b*, and common scratch pad 410*c*.

Accordingly, CPU 405 authorizes the access in the case that the requested access point(s) is(are) any of the resources described above. However, CPU 405 does not authorize the access if the requested access point(s) is(are) not among the resource(s) described above.

Next, CPU 405 notifies Java AP, which requests downloading the access, whether the access is authorized (Step S202), and terminates the access management process. Further, when Java AP in execution receives the authorization result executed by JAM, Java AP executes the process on the basis of the access request when the access is authorized; however, Java AP cancels the process on the basis of the access request when the access is not authorized.

Figure 8:
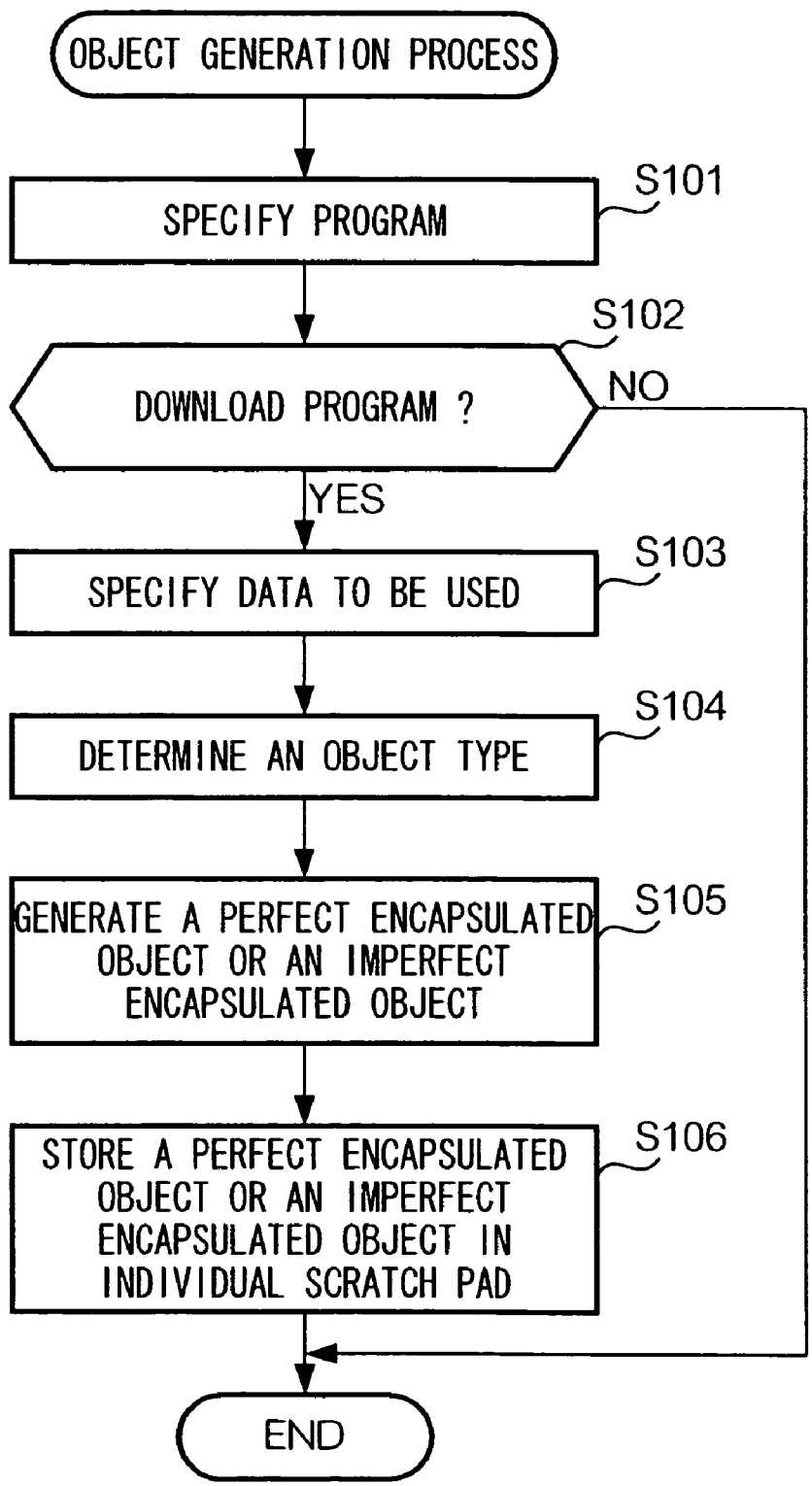
FIG. 8 is a flowchart explaining the operation of an object generating process executed by CPU in a mobile phone according to the first embodiment.

When CPU 405 in mobile phone 40 executes the downloaded Java AP, CPU 405 activates Java AP after executing the object generation process shown in FIG. 8. Further, in the execution of the downloaded Java AP, CPU 405 executes the access management process shown in FIG. 9. Accordingly, mobile phone 40 is always limited to access resources in the execution of the downloaded Java AP. As an example, mobile phone 40 cannot access address book data, e-mail data, incoming and outgoing history data, user data, and other data such as content.

For the above reason, CPU 405 in mobile phone 40 specifies data to be used by Java AP to be activated in the process of the object generation process, generates a perfect encapsulated object or an imperfect encapsulated object for the specified data, and stores it in scratch pad 410*b*. As described above, common scratch pad 410*c* is the resource which mobile phone 40 is authorized to access even though the access is limited by JAM. Java AP downloaded into mobile phone 40 is generated in such a manner that Java AP accesses a perfect encapsulated object or an imperfect encapsulated object both of which are stored in common scratch pad 410*c*, and instructs the object to manage data in the object by using methods belonging to the object.

For example, when a non-trusted application using address book data is generated, a perfect encapsulated object for address book data is generated by the object generation process described above, and the perfect encapsulated object is stored in common scratch pad 410*c*. Further, a non-trusted application instructs the generated perfect encapsulated object for address book data to manage data in the object by using the methods belonging to the object. Consequently, a part of address book data belonging to a perfect encapsulated object is displayed on a display, and the data belonging to a perfect encapsulated object is not given to a non-trusted application.

In the prior art, Java AP was not able to access address book data, e-mail data, incoming and outgoing history data, user data or the like to ensure data security with respect to the downloaded Java AP. Conversely, according to the present invention, since data is not given to Java AP by using a perfect encapsulated object, it is possible to ensure security with respect to the downloaded Java AP, and to display data, which was not authorized to be accessed, via a perfect encapsulated object. Consequently, in the present invention, the downloaded Java AP is able to execute various functions in mobile phone 40. In other words, Java AP functions are enriched.

Further, according to the present invention, a Java programmer is able to code a program for accessing data without considering an access method to data, or data security. Therefore, a programmer is able to work more efficiently with regard to productivity and program reliability.

1-2-3. Java AP Termination Process

Figure 10:
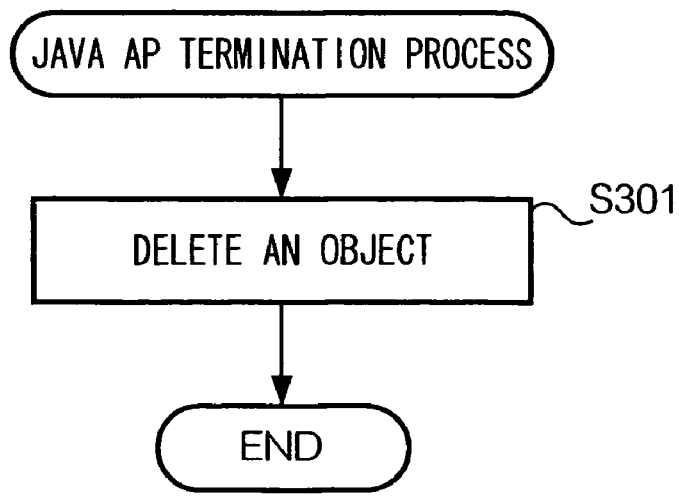
FIG. 10 is a flowchart explaining the termination operation of Java AP executed by CPU in a mobile phone according to the first embodiment.

Next, the Java AP termination process executed by CPU 405 in mobile phone 40 will be described with reference to FIG. 10. The Java AP termination process is executed by CPU 405 as a JAM function, and executed as an interruption process when an execution termination request of Java AP is generated.

As shown in the figure, CPU 405 in mobile phone 40 deletes a perfect encapsulated object and an imperfect encapsulated object stored in common scratch pad 401c when a Java AP termination request is generated(Step S301). A perfect encapsulated object and an imperfect encapsulated object deleted at Step S301 are generated in the object generation process (refer to FIG. 8) in the activation process of Java AP, and stored in common scratch pad 410c. CPU 405 terminates Java AP termination process after deleting the object from common scratch pad 410c.

Further, by generating a perfect encapsulated object and an imperfect encapsulated object and storing the objects in common scratch pad 401c when the downloaded Java AP is activated, and by deleting a perfect encapsulated object and an imperfect encapsulated object from common scratch pad 410c when the execution of downloaded Java AP is terminated, efficient use of memory resources of mobile phone 40 is ensured.

2. Second Embodiment

In the first embodiment, a perfect encapsulated object or an imperfect encapsulated object is generated whether a Java AP is a trusted application or a non-trusted application, regardless of data types. However, in the second embodiment, a perfect encapsulated object or an imperfect encapsulated object depending on the level of trust given to a Java AP, and the level of importance required for ensuring data. Further, an available object is determined depending on the level of trust of Java AP.

2-1. Configuration of the Embodiment

In the first embodiment, a value of the trusted application identifier of ADF is zero in the case of a Java AP to which trust is not given, and one in the case of a Java AP to which trust is given. However, in the second embodiment, levels of "High", "Middle" and "Low" are set in accordance with a level of trust given to a Java AP (Hereafter referred to as "Level of trust of Java AP". For example, "a level of trust given to Java AP is high" means that probability of managing data properly by Java AP is higher than predetermined standard probability.

2-1-1. Configuration of a Mobile Phone

Figure 11:
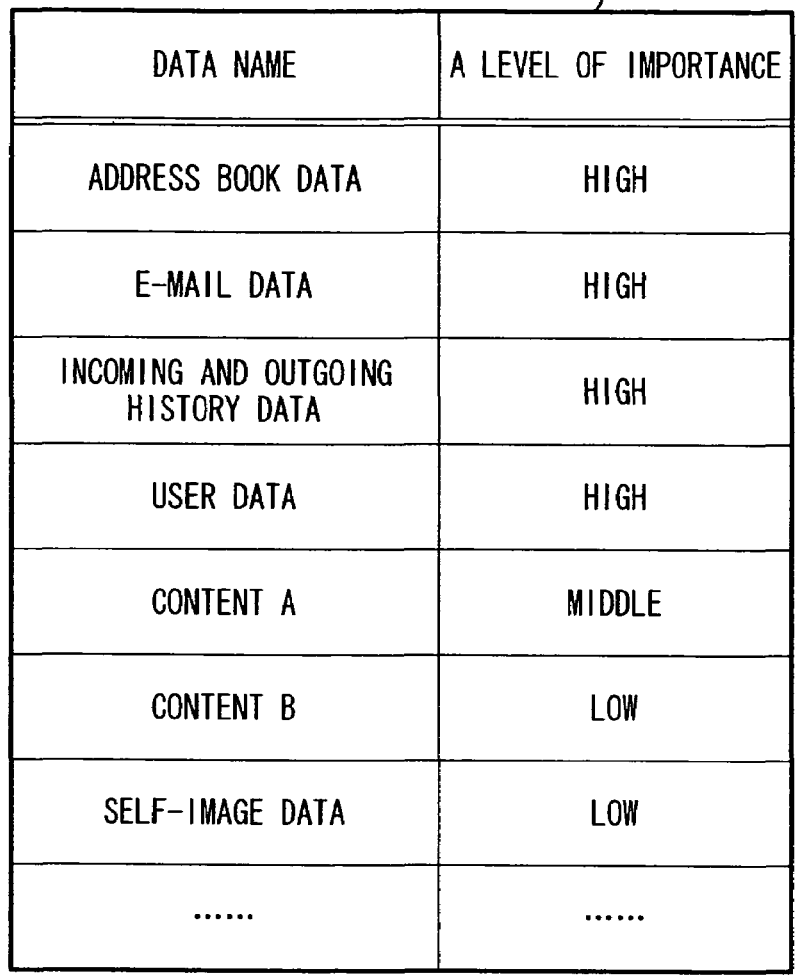
FIG. 11 is a diagram showing the data configuration of an importance table stored into nonvolatile memory in a mobile phone according to the second embodiment.

As shown in FIG. 11, an importance level table 410d is installed into nonvolatile memory 410 of mobile phone 40.

As shown in this figure, the level of importance is set to "high" with regard to the data required to be ensured at a high level such as address book data, e-mail data, incoming and outgoing history data, user data and the like each of which are stored in mobile phone 40. Further, it is set to "middle" with regard to the data required to be ensured at a middle level, and it is set to "low"" with regard to the data required to be ensured at a low level.

Further, as shown in FIG. 12, an application data relation table 410e is installed into nonvolatile memory 410 of mobile phone 40. In the table, it is determined whether the data is managed as a perfect encapsulated type or as an imperfect encapsulated type on the basis of a combination of the level of importance of data and level of trust of Java AP. For example, in this figure, a perfect encapsulated type is set, regardless of the importance of data in the case of Java AP, at a high level of trust. Further, with regard to Java AP at the middle level of trust, a perfect encapsulated type is set at a high or middle level of importance of data, and an imperfect encapsulated type is set to a low level of importance.

Further, an available object is installed into application data relation table 410e in accordance with the level of trust of Java AP. For example, in this figure, when Java AP is at a high level of trust, Java AP is able to use a perfect encapsulated object and an imperfect encapsulated object. Accordingly, Java AP is able to use an imperfect encapsulated object to be generated regardless of the level of importance of data. Further, Java AP at the low level of trust is able to use a perfect encapsulated object and an imperfect encapsulated object. Accordingly, Java AP is able to use a perfect encapsulated object when the level of importance of data is high or middle, and use an imperfect encapsulated object when the level of importance of data is low.

The contents of importance level table 410d and application data relation table 410e described above are registered in advance at the time of shipping mobile phone 40; however, with regard to the contents downloaded from a server, the data is stored in importance level table 410d at the time of downloading. Further, a user is able to input a value into the above-described tables by using mobile phone 40.

The other configurations besides the one described in this embodiment are the same as the first embodiment, and therefore the description will be omitted.

2-2. Operation of the Embodiment

The operation of the embodiment will be described.

The downloaded Java AP, address book data, e-mail data, user data and the like are stored in nonvolatile memory 410, and the data contents shown in FIG. 11 and FIG. 12 are stored in importance level table 410d and application data relation table 410e.

2-2-1. Object Generation Process

Next, the object generation process will be described with reference to the flowchart shown in FIG. 8.

The operation from Step S101 to Step S103 is the same as that of the first embodiment. Next, CPU 405 refers to a trusted identifier of ADF corresponding to Java AP by using nonvolatile memory 410, and obtains the level of trust of Java AP. Then, CPU 405 refers to application data relation table 410e and determines whether the object type of managing data is "perfect encapsulated type" or "imperfect encapsulated type" on the basis of the level of importance of data and the level of trust of Java AP. (Step S104). For example, in the case that the data to be used by Java AP is address book data, CPU 405 reads out as "high" the level of importance of address book data with reference to importance level table 410d. Further, for example, in the case that the level of trust obtained from an ADF trusted identifier corresponding to Java AP is "low", the object type for managing the address book data is determined as "perfect encapsulated type" by application data relation table 410e.

CPU 405 generates a perfect encapsulated object or an imperfect encapsulated object on the basis of the specified data at Step S103 and the determined object type at Step S104 (Step S104). In the case that the object type determined at Step S104 is a perfect encapsulated type, CPU 405 activates a perfect encapsulated API into an original extended library, and generates a perfect encapsulated object. Further, in the case that the object type determined at Step S104 is an imperfect encapsulated type, CPU 405 activates an imperfect encapsulated API into an original extended library, and generates an imperfect encapsulated object.

Next, CPU 405 stores the generated perfect encapsulated object, or the generated imperfect encapsulated object in common scratch pad 410c(Step S106), and terminates the object generation process.

Further, in the case that a plurality of data to be used by Java AP is specified at Step S103, the process from Step S104 to S106 is repeated for each item of data for generating the perfect encapsulated object or the imperfect encapsulated object for each item of specified data, and storing the object in common scratch pad 410c. Then, CPU 405 activates a Java AP designated as a program to be executed, and performs the process on the basis of the program after terminating the object generation process.

2-2-2. Object Usage Management Process

Figure 13:
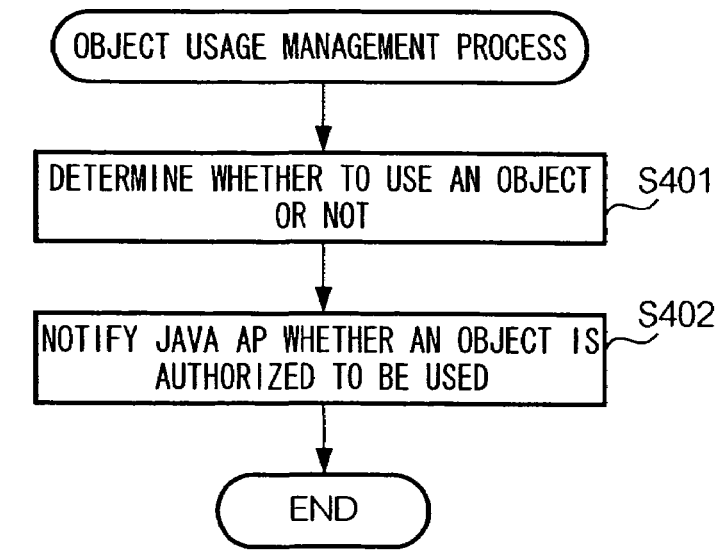
FIG. 13 is a flowchart explaining the operation of an object usage management process executed by CPU in a mobile phone according to the second embodiment.

Next, the object usage management process executed by CPU 405 in mobile phone 40 will be described with reference to FIG. 13.

As shown in this figure, when a request for using an object in the execution process of Java AP is generated by Java AP, CPU 405 in mobile phone 40 distinguishes whether the object is authorized to be used by Java AP by referring to application data relation table 410e, and determines whether to authorize using the object (Step S401). In this case, as shown in application data relation table 410e(FIG. 12), a perfect encapsulated object and an imperfect encapsulated object are available, and therefore an object is authorized to be used.

Next, CPU 405 notifies Java AP, which has requested to use an object, whether the object is authorized to be used (Step S402), and terminates the object usage management process. When a Java AP in the execution process receives the above notification, a Java AP executes the process on the basis of the request in the case that the object is authorized to be used, or cancels the process on the basis of the request in the case that the object is not authorized to be used.

In this case, both a perfect encapsulated object and an imperfect encapsulated object are authorized to be used, and a Java AP accesses data by using a perfect encapsulated object, or an imperfect encapsulated object.

The authorization level (1.data is given to Java AP, 2.data is obtained by Java AP, but not given, 3.data is neither given nor obtained) which enables a Java AP to access data, is set in accordance with various combinations of data and Java AP since an object to be generated is determined on the basis of the level of importance of data and the level of trust of Java AP, and an object to be used is determined on the basis of the level of trust of Java AP. Consequently, various Java APs (application programs) are executed in mobile phone 40 by maintaining data security. Further, the authorization level can be set by using importance level table 410d and application data relation table 410e. Then, when a Java programmer codes a program for accessing data, the Java programmer is able to use an object whose authorization level is predetermined in the above tables without considering an access method to data. Therefore, a programmer is able to work more efficiently with regard to productivity and program reliability.

3. Modifications

While the invention has been described with reference to its currently best-known modes of operation and embodiments, other modes, embodiments and advantages of the present invention will be apparent to those skilled in the art and are contemplated herein. Although those skilled in the art would recognize that other embodiments of the present invention are envisioned, the following claims define the broad scope of the present invention. Further, the present invention may have the following modifications.

(1) In the second embodiment, the contents set in application data relation table 410e are shown as an example. The contents shown in FIG. 14 can also be set as shown in application data relation table 410e. CPU 405 generates a perfect encapsulated object in the case that the level of importance of data is "high", and an imperfect encapsulated object in the case that the level of importance of data is "middle" or "low" by referring to application data relation table 410e regardless of the level of trust of a trusted application identifier. Then, in the execution of Java AP, Java AP uses neither a perfect encapsulated object nor an imperfect encapsulated object in the case that the level of trust of a trusted application identifier, corresponding to a Java AP, is "low", uses only a perfect encapsulated object in the case that the level of trust of a trusted application identifier is "middle", and uses both a perfect encapsulated object and an imperfect encapsulated object in the case that the level of trust of a trusted application identifier is "high".

This enables CPU 405 to determine an object to be generated only on the basis of the level of importance of data, and to determine whether to use the generated object only on the basis of the level of trust given to a Java AP in the case of using the generated object.

(2) In the second embodiment, importance level table 410d and application data relation table 410e are used. However, these tables are only examples of data configuration, and the best data configuration may be selected in accordance with a communication device. For example, it is not necessary to use importance level table 410d in the case that the data showing the level of importance is given to data such as address book data, e-mail data, and contents.

(3) In the above embodiments, a trusted application identifier, included into ADF corresponding to a Java AP, is used to identify whether the downloaded Java AP is a trusted application, or a non-trusted application, or to identify the level of trust of Java AP. However, this is just one example. A further example is as follows: by installing a management server device, for managing data relating to the level of trust (e.g. the level of trust of Java AP or Java AP is certified as a trusted application) given to Java AP, CPU 405 in mobile phone 40 receives data from a management server device in the case that data relating to the level of trust given to Java AP is stored in a management server. Further, in the above embodiments, it is described that a Java AP downloaded by content server 10 connected to the Internet 20 is used. However, the present invention has an effect on a program which is not a native program, that is to say, a program stored in a memory of mobile phone 40 after the sale of mobile phone 40. For example, in the case that mobile phone 40 comprised of an infrared interface receives a program from a communication device such as a personal computer having an infrared interface by infrared communication, and receives data on the level of trust given to a program from a management server.

(4) In the above embodiments, a perfect encapsulated object and an imperfect encapsulated object are generated in the case of instructing to execute the downloaded Java AP, the timing for generating a perfect encapsulated object and an imperfect encapsulated object is not limited to only at the time of instructing of execution of a Java AP. For example, the object may be generated at the timing that a Java AP refers to data.

(5) In the above embodiments, content server 10 is connected to the Internet 20. However, content server 10 is directly connected to gateway server 31 in mobile packet communication network 30.

Figure 15:
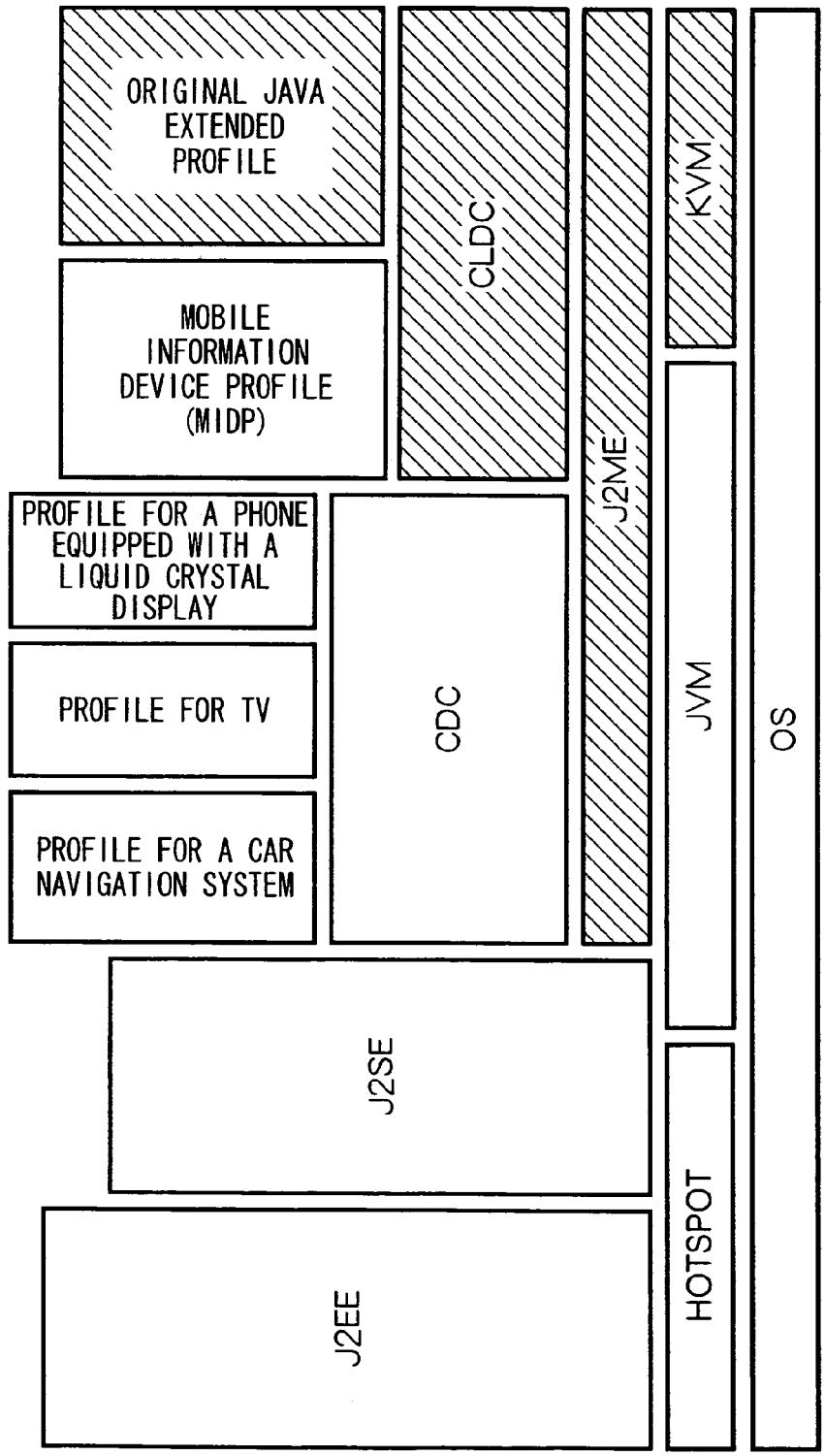
FIG. 15 is a diagram explaining the modifications of the Java execution environment according to the modifications of the present invention.

(6) In the above embodiments, as shown by hatching in FIG. 15, it is described that the present invention is applied to mobile phone 40 comprised of KVM, CLDC as a configuration, and J2ME having an original Java extended profile. However, a Java execution environment is not limited only to a combination of KVM and J2ME. Further, a communication device used in the present invention is not limited to a mobile phone.

For example, as shown in the figure, MIDP (Mobile Information Device Profile) may be used as a J2ME profile instead of an original Java extended profile. Further, JVM instead of KVM, CDC (Connected Device Configuration) instead of CLDC as a configuration for J2ME may be used in the configuration. Moreover, a profile for a phone equipped with a liquid crystal display, a profile for a TV, a profile for a car navigation system and the like may be used as a profile for J2ME in the configuration. Further, HotSpot, J2SE(Java 2 Standard Edition), or J2EE(Java 2 Enterprise Edition) may be used in the configuration.

Figure 16:
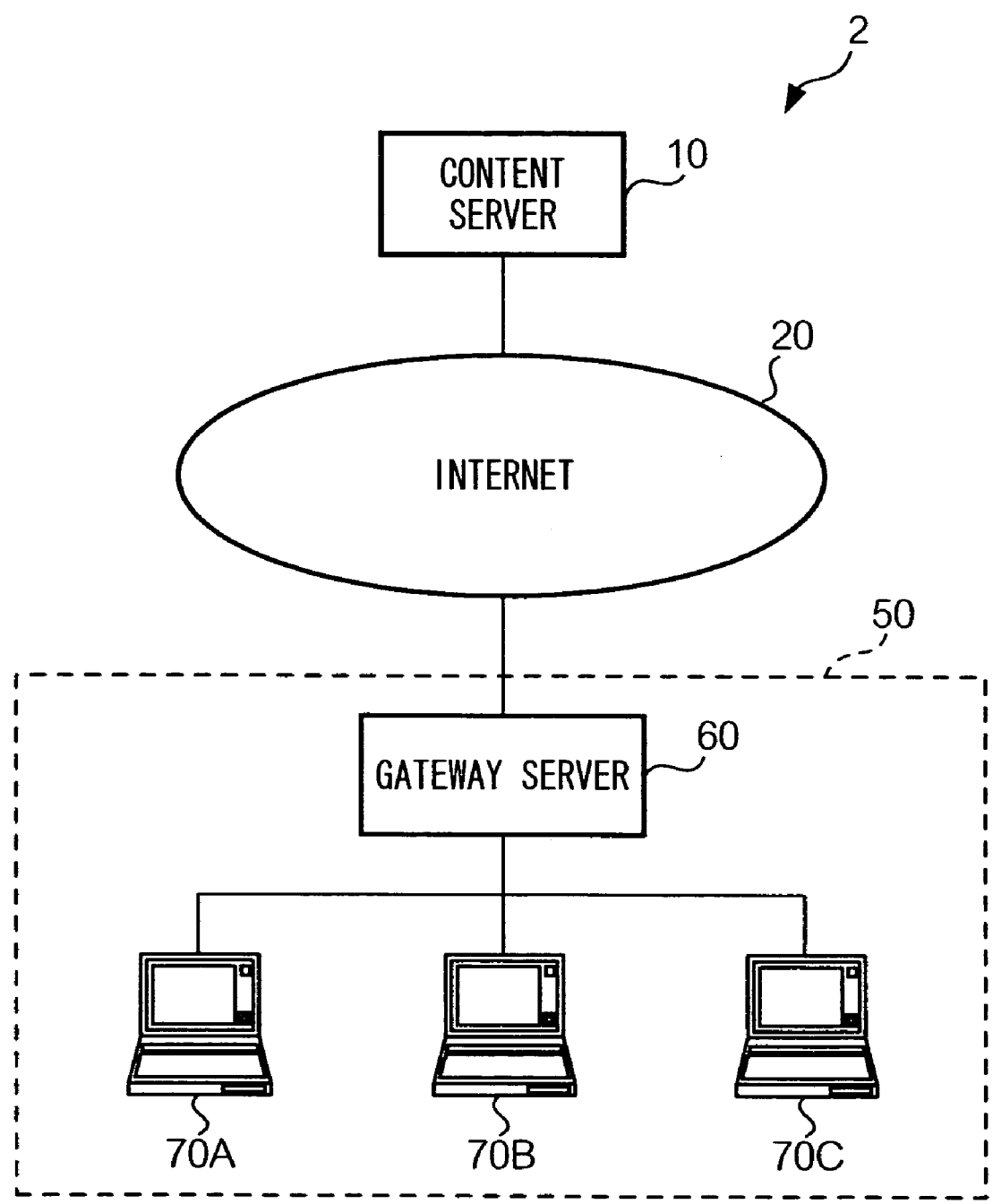
FIG. 16 is a diagram exemplifying the modifications of a communication system according to the modifications of the present invention.

(7) As is obvious from modifications of a Java execution environment as described above, the present invention may be applied to various types of electronic devices having communication functions, such as a PHS (Personal Handy System®), a PDA (Personal Digital Assistant), a car navigation device or a personal computer. Further, the present invention is not limited to communication devices stored in mobile packet communication network 30. For example, the present invention may be applied to a personal computer 70A, 70B, and 70C in communication system 2 shown in FIG. 16.

(8) Further, in the above embodiments, it is described that a Java AP written in a Java programming language is used, however, programming language is not limited to Java. For example, C++ may be used for constructing the system depending on the level of security required for the system.

As described above, the present invention makes it possible to manage data by various programs by ensuring security of the data, since access control to data stored into a communication device is executed in accordance with a level of trust given to a program to be downloaded and to a level of importance of data

The invention claimed is:

1. A data processing device comprising:
a memory that stores one or more data sets and programs including one or more application programs; and
a processor that executes the programs to function as:
an object generator that generates an object containing one or more procedures of operation using at least one of the one or more data sets, the one or more procedures being called and executed by the processor in accordance with an application program stored in the memory,
a data access manager that prohibits any access to the one or more data sets by the processor running the application program stored in the memory without calling and executing a procedure contained in an object generated by the object generator, and
an object generation manager that determines whether to generate a perfect encapsulated object or an imperfect encapsulated object based on reliability of one application program among the one or more application programs, the perfect encapsulated object being an object containing no procedures of operation making a specific data set among the one or more data sets accessible by the processor running any one of the one or more application programs, the object generation manager allows the object generator to generate, in accordance with the one application program among the one or more application programs, the imperfect encapsulated object that is an object containing procedures of operation making the specific data set among the one or more data sets accessible by the processor running any one of the one or more application programs, if it is determined to generate an imperfect encapsulated object.

2. The data processing device according to claim 1, wherein the memory stores reliability information indicating degree of reliability of each of the one or more application programs, and
wherein the object generation manager determines whether to generate a perfect encapsulated object or an imperfect encapsulated object based on the reliability information stored in the memory.

3. The data processing device according to claim 1, further comprising:
a communication interface that receives from a server reliability information indicating degree of reliability of each of the one or more application programs; and
wherein the object generation manager determines whether to generate a perfect encapsulated object or an imperfect encapsulated object based on the reliability information received by the communication interface.

4. The data processing device according to claim 1, wherein the object generator generates a perfect encapsulated object when the object generator is not allowed by the object generation manager to generate the imperfect encapsulated object.

5. The data processing device according to claim 1, wherein the object generation manager determines to generate the imperfect encapsulated object only when importance of the specific data set meets a predetermined requirement.

6. The data processing device according to claim 1, wherein the data access manager does not prohibit access to the one or more data sets by the processor without calling and executing a method contained in an object generated by the object generator when the processor runs an application program that is preinstalled in the memory.

7. The data processing device according to claim 1, wherein the data access manager allows the processor to access only data sets that are stored in a memory area allotted to the one application program or in a memory area allotted to all of the one or more application programs, when the processor runs the one application.

8. The data processing device according to claim 1, wherein at least one of the one or more application programs is described as a set of intermediate codes required to be converted into executable codes before execution, and
wherein the processor that executes the programs stored in the memory to further function as a converter that converts an application program described as a set of intermediate codes into executable codes.

9. The data processing device according to claim 1, wherein the object generation manager that determines to generate an imperfect encapsulated object only when reliability of the one application meets a predetermined requirement.

10. A data processing device comprising:

a memory that stores at least one data set and at least one application program; and a processor in communication with the memory, the processor configured to:

generate an object containing at least one procedure of operation using the at least one data set, the procedure being executed by the processor in accordance with the at least one application program stored in the memory;

analyze at least one of the application program and the data set;

determine whether to generate an imperfect encapsulated object or a perfect encapsulated object based on the analysis of at least one of the application program and the data set, the imperfect encapsulated object being an object containing one or more procedures of operation making the at least one data set accessible by the processor running the application program, the perfect encapsulated object being an object containing no procedures of operation making the at least one data set accessible by the processor running the application program;

generate the imperfect encapsulated object if it is determined to generate the imperfect encapsulated object; and generate the perfect encapsulated object if it is determined to generate the perfect encapsulated object.

11. The data processing device of claim 10, wherein to analyze at least one of the application program and the data set, the processor is further configured to analyze reliability of the application program.

12. The data processing device of claim 10, wherein to analyze reliability of the application program, the processor is configured to analyze a trusted application identifier associated with the application program.

13. The data processing device of claim 11, wherein to analyze at least one of the application program and the data set, the processor is configured to analyze at least one aspect of the data set.

14. The data processing device of claim 13, wherein to analyze the at least one aspect of the data set, the processor is configured to analyze an importance identifier associated with at least a part of the data set.

15. The data processing device of claim 13, wherein to analyze at least one aspect of the data set, the processor is configured to analyze a storage location of the data set within the memory.

16. The data processing device of claim 10, wherein the process is further configured to execute the application program, and wherein the processor is further configured to analyze at least one of the application program and the data set and to determine whether to generate an imperfect encapsulated object or a perfect encapsulated object during execution of the application program.

* * * * *

UNITED STATES PATENT AND TRADEMARK OFFICE
CERTIFICATE OF CORRECTION

PATENT NO. : 7,644,444 B2
APPLICATION NO. : 10/684968
DATED : January 5, 2010
INVENTOR(S) : Kamiya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Twenty-first Day of December, 2010

David J. Kappos
*Director of the United States Patent and Trademark Office*